United States Patent [19]

Mount, II

[11] Patent Number: 4,800,537

[45] Date of Patent: Jan. 24, 1989

[54] METHOD AND APPARATUS FOR DETERMINING CEMENT CONDITIONS

[75] Inventor: Houston B. Mount, II, Tulsa, Okla.

[73] Assignee: Amoco Corporation, Chicago, Ill.

[21] Appl. No.: 893,055

[22] Filed: Aug. 1, 1986

[51] Int. Cl.[4] .............................................. G01V 1/40
[52] U.S. Cl. ....................................... 367/35; 181/105
[58] Field of Search ....................... 367/35, 25, 27, 28, 367/911; 181/104, 102, 105; 324/367, 368; 73/151, 152

[56] References Cited

U.S. PATENT DOCUMENTS

| | | | |
|---|---|---|---|
| 3,363,719 | 1/1968 | Venghiattis | 181/5 |
| 3,691,518 | 9/1972 | Schuster | 340/18 P |
| 3,833,841 | 5/1975 | Norel et al. | 340/15.5 A |
| 4,130,816 | 12/1978 | Vogel et al. | 181/102 |
| 4,255,798 | 3/1981 | Havira | 367/35 |
| 4,495,605 | 1/1985 | Desbrandes et al. | 367/27 |
| 4,646,565 | 3/1987 | Siegfried | 181/105 |
| 4,665,511 | 5/1987 | Rodney et al. | 367/35 |

OTHER PUBLICATIONS

Havira, R. M., "Ultrasonic Cement Bond Evaluation," SPWLA 23rd Annual Logging Symposium, Jul. 6–9, 1982.

Primary Examiner—Nelson Moskowitz
Assistant Examiner—Ian J. Lobo
Attorney, Agent, or Firm—Scott H. Brown; Fred E. Hook

[57] ABSTRACT

An apparatus and method of use thereof are disclosed herein for determining cement conditions adjacent a casing set within a wellbore. At least one acoustic transmitting and receiving transducer and at least one acoustic receiving transducer are positioned into contact with the interior surface of the casing. At least one pulse of acoustic energy is transmitted into the media surrounding the wellbore from the at least one acoustic transmitting and receiving transducer. Electrical signals are generated in response to acoustic energy received by both transducers from the surrounding media. Representations of the generated electrical signals are recorded as a function of the depth within the wellbore and are indicative of the cement conditions, including the casing-cement bond, the cement-formation bond, cement thickness, and the acoustic velocity associated with the cement.

2 Claims, 2 Drawing Sheets

METHOD AND APPARATUS FOR DETERMINING CEMENT CONDITIONS

BACKGROUND OF THE INVENTION

1. Field of the Invention

The present invention relates to a method and apparatus for determining cement conditions and, more particularly, to such a method and apparatus wherein an acoustic energy source is placed against an interior surface of a casing set within a wellbore to determine the quality of the cement bond, the thickness of the cement, and the acoustic velocity associated with the cement.

2. Setting of the Invention

After a wellbore has been drilled through a subterranean formation, a casing or tubing string is required by statute or regulation to be set therein with a hydraulic bond, as by cementing. Further, it is a requirement that the hydraulic bond be tested to determine if a channel in the cement is present, if a microannulus has formed between the cement and the casing as by shrinkage of the cement, or if the surface of the casing or tubing is defective.

Numerous prior art apparatuses have been developed to determine the quality of the cement bond and are referred to hereinafter as CBL methods and apparatuses. Primarily, the prior art CBL apparatuses include an acoustic transmitting transducer and a plurality of acoustic receivers suspended via a wireline within a wellbore. The acoustic transmitting transducer emits acoustic energy which must pass through the fluid in the wellbore, and into the casing.

In one type of prior art CBL system, acoustic energy encounters the casing and passes therethrough, i.e., the casing acts as a wave guide. The suspended acoustic receivers receive reflected energy and the resulting signals indicate the amount of energy attenuation as the acoustic energy passes through the casing. The better the cement bond with the casing, the greater signal attenuation will result. Conversely, little or no signal attenuation indicates that there are voids in the cement-casing interface.

Another type of prior art CBL system uses pulses of acoustic energy directed at a normal incidence to the casing so that the energy passes through the casing and is reflected back. The suspended acoustic receivers receive reflected energy and the resulting signal amplitudes are analyzed. The better the cement bond with the casing, the lower the signal amplitude. Conversely, a relatively high amplitude indicates a poor cement bond. In both systems, the acoustic receivers convert the acoustic energy reflections into electrical signals, which are preprocessed and transmitted to surface processing equipment to generate a signal amplitude-vs-time plot. A trained well log analyst then can review the plot and determine the quality of the cement bond.

Two of the major problems associated with the prior art methods described above are signal attenuation and transducer misalignment. By placing the acoustic transmitting transducer within the casing but *not* into contact with the casing, a substantial portion of the transmitted acoustic energy is attenuated by the wellbore fluid and the casing. The fluid's and the casing's impedance are substantially different from that of the transducer and the transmitted energy tends to reverberate within the casing causing it to "ring." Thus, on a plot of the received signals, the important signal representative of the interface between the cement and the casing can be hidden or "smeared" by the resultant signal caused by the casing ringing. Further, the equally critical interface between the cement and the formation can be hidden by the casing ringing or, because so much acoustic energy is lost to the wellbore fluid and casing, this interface is not discernible on the plot at all.

The major problem of transducer misalignment is caused when the pulse-echo transducer is not centered within the casing so that transmitted acoustic energy contacts the casing at a nonperpendicular angle, i.e., at a normal incidence. A substantial portion of the acoustic energy may not penetrate the casing and cement. Further, the energy becomes defocused making image reconstruction difficult.

Another major problem with prior art pulse-echo CBL methods and apparatuses is the frequency needed to penetrate the wellbore fluid is not best for signal interpretation. A low frequency signal is desired to prevent high signal attenuation as it passes out through the wellbore fluid and back, but a low frequency signal is the least desired for signal interpretation. This is because the length of the signal can be greater than that needed to define a particular event, such as the casing-cement interface. The low frequency signal smears the desired amplitude peaks used to define events.

Another major problem with prior art casing attenuation CBL methods and apparatuses is that the energy is transmitted radially and thus received radially. What this means is that one portion of the cement could be bonded adequately to the casing while another portion has no cement at all, which could lead to a catastrophic well failure, but because the signal is radially received, it is an average signal at that depth. The well log analyst would only "see" on the resulting plot an acceptable signal.

A paper entitled "Ultrasonic Cement Bond Evaluation" by R. M. Havira, SPWLA, July 1982 and U.S. Pat. No. 4,255,798 (Havira) both disclose a pulse-echo CBL method wherein a single acoustic transmitting and receiving transducer is suspended within a wellbore. Nowhere is it disclosed or suggested in these disclosures to place an acoustic transmitting and receiving transducer into contact with the interior surface of the casing to eliminate the problems associated with this type of system.

U.S. Pat. No. 3,691,518 (Schuster) and U.S. Pat. No. 3,883,841 (Norel, et al.), both disclose CBL methods wherein an acoustic transmitting transducer is suspended within a wellbore and at least one acoustic receiving transducer is placed into contact with the interior surface of the casing. Nowhere is it disclosed or suggested in Schuster or Norel, et al., to place an acoustic transmitting and receiving transducer into contact with the interior surface of the casing to eliminate the problems associated with this type of system.

U.S. Pat. No. 3,363,719 (Venghiattis) discloses a velocity logging method wherein an acoustic transmitting transducer and an acoustic receiving transducer are placed into contact with the formation material to determine the shear and compressional velocities of the formation. Nowhere is it disclosed or suggested in Venghiattis to place an acoustic transmitting and receiving transducer into contact with the interior surface of a casing or to determine the quality of the cement bond between the casing and the formation.

There is a need for a CBL apparatus and a method of use thereof which can evaluate and determine the cement conditions adjacent a cased wellbore such that a substantial portion of the acoustic energy passes through the casing into the cement and the formation with proper alignment so that the cement conditions can be determined more accurately than previously utilized methods.

The quality of the cement and the condition of the cement bond with the formation are important; however, equally important is the determination of the thickness of the cement and the acoustic velocity associated with the cement. Because the casing is usually not centered within the wellbore, cement may not uniformally surround the casing, i.e., where the casing is closest to the formation, little or no cement may be present. Prior art CBL methods use signal averaging of the cement bond at a certain depth, so the lack of cement at one azimuthal location on the casing may not be detected because its signal would be averaged into the signals from the other locations. Oftentimes cement can include various foreign material picked up during the passage through the wellbore. Therefore, the cement could include irregularities or voids and zones of inadequate strength. As stated above, prior art CBL methods use signal averaging of the cement bond readings, so the variations in cement quality at one azimuthal location may not be detected.

There is a need for a method of determining the thickness of the cement at a particular azimuthal location at a certain depth within the wellbore and a need for a method of determining an indication of the quality of of the cement, such as acoustic velocity, at a particular azimuthal location at a certain depth within the wellbore.

SUMMARY OF THE INVENTION

The present invention has been contemplated to meet the above described needs and overcome the foregoing disadvantages. The present invention provides apparatuses and methods of use thereof for determining the cement conditions, such as the quality of the cement bond, cement thickness and acoustic velocity, adjacent a casing set within a wellbore. The apparatus includes a body adapted for passage through the casing. At least one acoustic transmitting and receiving transducer and at least one acoustic receiving transducer are carried by the body, with the at least one acoustic receiving transducer being vertically spaced from the at least one acoustic transmitting and receiving transducer. An extension device is provided on the tool body for placing the at least one acoustic transmitting and receiving transducer and the at least one acoustic receiving transducer into contact with the interior surface of the casing.

Once the at least one acoustic transmitting and receiving transducer and the at least one acoustic receiving transducer have been placed into contact with the casing, a pulse of acoustic energy is transmitted through the casing to a reflective boundary representative of the interface of disparate materials surrounding the casing, such as the surrounding media of cement and the formation material. Electrical signals are generated by the acoustic transmitting and receiving transducer and the acoustic receiving transducer, in response to the reflected acoustic energy received thereat from the interface. Representations of the generated electrical signals are processed within the tool or transmitted to the surface, as a function of the depth of the acoustic transducers within the wellbore. These representations can be plotted on a signal amplitude vs time plot to be reviewed by a well log analyst to determine the quality of the cement bond. By way of the present invention, the acoustic transmitting transducer is placed into contact with the casing to prevent any misalignment problems and so that a substantial portion of the energy emanating from the acoustic transmitting and receiving transducer passes through the casing into the surrounding media without the problems with the prior art CBL methods described above.

Further, by knowing the vertical distance between the at least one acoustic transmitting and receiving transducer and the at least one acoustic receiving transducer and the traveltimes of the acoustic energy from the acoustic transmitting and receiving transducer and back to the acoustic receiving transducer, one can determine the thickness of the cement at a particular azimuthal location within the wellbore. Also, by knowing the traveltimes and vertical distance, one can determine the velocity of the acoustic energy through the cement at a particular azimuthal location within the wellbore.

DETAILED DESCRIPTION OF THE INVENTION

As has been stated above, the present invention comprises an apparatus and methods of use thereof for determining the cement conditions adjacent a casing set within a wellbore. At least one acoustic transmitting and receiving transducer and at least one acoustic receiving transducer are positioned into contact with the interior surface of the casing. A pulse of acoustic energy is transmitted to the reflecting boundary representative of an interface between disparate materials, such as the surrounding media with the wellbore, from the at least one acoustic transmitting and receiving transducer. Electrical signals are generated by the at least one acoustic transmitting and receiving transducer, and the at least one acoustic receiving transducer, in response to acoustic energy received thereat from the surrounding media. Representations of the generated electrical signals are recorded as a function of the depth and at least one parameter of the cement, such as cement bond, cement thickness, or cement acoustic velocity, can be determined therefrom.

Figure 1:
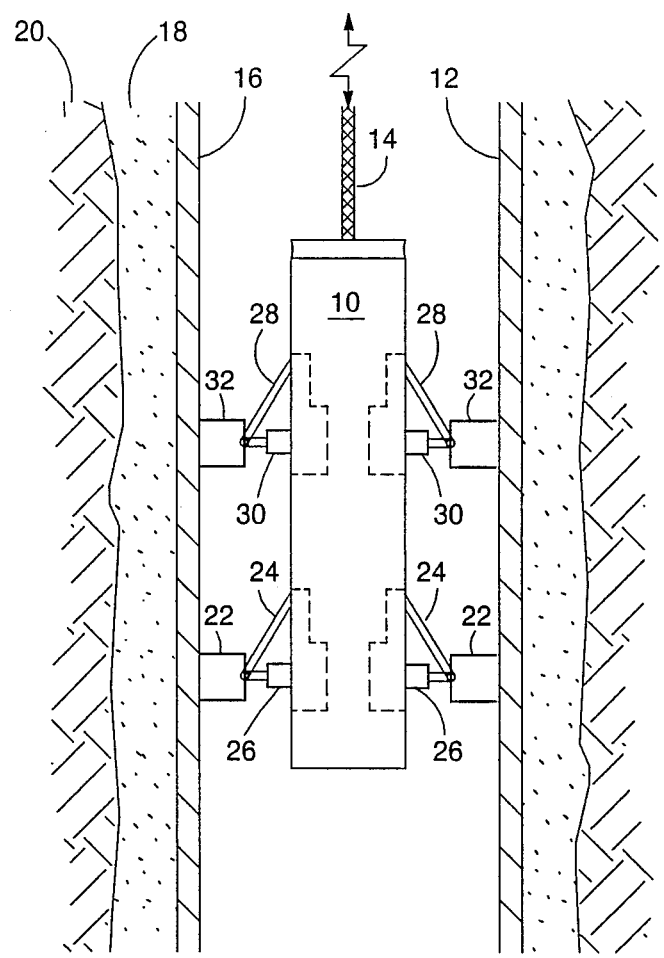
FIG. 1 is an elevational view of a cement bond logging apparatus, embodying the present invention, suspended within a wellbore.

As shown in FIG. 1, a tool body (10), often called a sonde, is suspended within a wellbore (12) via a multichannel electrical wireline or cable (14), as is well known to those skilled in the art. The wellbore (12) includes a tubing or casing string (16), which is set and hydraulically bonded by a column of cement (18) to a subterranean formation (20).

The wireline (14) includes electrical wiring to convey electrical power to the body (10) and control/command signals to the various equipment included within the body (10). The body (10) itself can include microprocessor control circuitry to control the transmission and reception of acoustic energy from transducers, as will be described below. The acoustic energy signals can be preprocessed within the body (10) or can be transmitted to the surface through the wireline (14) for processing.

At least one acoustic transmitting and receiving transducer (22) is carried by the tool (10), such as by being mounted to an extendable and retractable arm member (24). A mechanical extension and retraction mechanism, such as a piston assembly (26), is used to extend and retract the arm member (24) to thereby place the acoustic transmitting and receiving transducer (22) into contact with the interior surface of the casing (16). Other assemblies, such as gears, springs, and the like can be used to extend and retract the arm member (24), as is well known to those skilled in the art. When retracted, the arm member (24) can be received within a cutout or recess (shown by dotted lines) in the body (10) to facilitate movement through the casing (16).

The body (10) can also include an extendable pad member (28) having a piston assembly (30) or other suitable mechanism to extend and retract at least one acoustic receiving transducer (32) into contact with the interior surface of the casing (16).

The acoustic transmitting and receiving transducer (22) and the acoustic receiving transducer (32) are vertically spaced one from the other either directly in line or offset, such as in a helical pattern. Further, either transducer can be one above the other, but at least one of each type of transducer being vertically spaced are needed for the operation of the present invention. One variation not shown is for the tool (10) to include only one acoustic transmitting and receiving transducer (22) and only one acoustic receiving transducer (32) mounted vertically in line with each other and having one or more extendable shoes mounted on the tool (10), without any transducers (22, 32) thereon, to push the transducers (22, 32) into contact with the interior surface of the casing (16).

The embodiment of the present invention shown in FIG. 1 includes more than one evenly circumferentially spaced acoustic transducers of both types (22, 32). The transducers (22, 32) are spaced about the tool in circumferential sectors; i.e., at 90° intervals of any other suitable interval depending upon how many sets of transducers (22, 32) are used. The acoustic transducers (22, 32) can lie within the same horizontal plane or in helical pattern as desired to obtain a plurality of plots of the cement quality at one or more depths within the casing (16).

The acoustic energy pattern that emanates from the acoustic transmitting and receiving transducer (22) can be broadly fan shaped or, preferably, directive with a frequency of between about 20 KHz to about 15 MHz. The preferable range of frequency is from about 1 MHz to obtain better time/element resolution, to about 10 MHz to avoid coupling and attenuating problems with higher frequencies. Further, the transducers (22, 32) can be of the same or different types, such as magnetorestrictive, piezoelectric, or any other suitable type.

To reduce the loss of acoustic energy at the transducer-casing interface, the acoustic impedance of the transducers (22, 32) should be matched to be as equivalent as possible to that of the casing material, such as steel, aluminum, fiber glass, or the like. For example, the acoustic impedance can be from about $4.16 \times 10^6$ kg/m$^2$ sec to about $46 \times 10^6$ kg/m$^2$ sec. Preferably, each acoustic transducer (22, 32) is formed from a piezoelectric disk crystal which includes a matched impedance backing so that the acoustic pulse is formed at the resonant frequency of the crystal. Any pulse exiting from the backside is attenuated while the frontside is designed to direct the acoustic energy outward to the casing rather than back into the tool itself. Further, the material used in manufacturing the transducer is extremely brittle; therefore, it is preferable that the transducer itself not be placed into direct contact with the casing but include some form of a wear layer. One such wear layer can be a material called Torlon, which is a high-performance resin made by Amoco Chemicals Corporation. Other materials include araldite, metolux, rilson, teflon, or even nonattenuative metals, such as brass or steel. Obviously, it is important for the wear layer to be of a low acoustic attenuation material to preserve the acoustic operability of the present invention.

Appropriate electronic circuitry, including one or more microprocessors, are used to generate a master timing pulse for synchronizing the various components of the apparatus at the surface or within the body (10) itself. Upon command from an operator at the surface through the wireline (14) or from an internal signal command generator, the acoustic transmitting and receiving transducer (22) fires a pulse of acoustic energy directly through the casing (12) and cement (18) and into the formation (20). Control circuitry at the surface or within the body (10) is then used to receive reflected acoustic energy by the acoustic transmitting and receiving transducer (22) and the acoustic receiving transducer (22). The reflected acoustic energy is converted into electrical signals which are then preprocessed and transmitted through the wireline (14) to recording circuitry at the surface or the electrical signals are stored internally within the tool itself. The electrical signals, which are representations of the time the acoustic signal was received and its relative amplitude, are then sent to a programmable digital computer and associated memory which stores the signals, controls the recording of the signals onto tape drives, if desired, and provides an analog output signal which has an amplitude directly proportional to the particular acoustic traveltime measurement. The output signal, in the form usually of a time vs signal amplitude plot at a certain depth within the casing (10), is transmitted to an indicating device, such as a recording galvanometer or a CRT or hard-copy plotter for visual interpretation.

After a predetermined number of pulses, the body (10) can be lowered or raised through the wellbore bore (12) while continuing to transmit and receive or landed at the next location of interest. A signal can be sent through the wireline (14) or generated within the tool (10) to retract the arm members (24, 28, 38) to remove the transducers (22, 32) from contact with the casing (12) while the body (10) is being raised or lowered, i.e., during logging. If more than one transducer grouping is utilized a separate timing circuit is required to cause the individual transducers to transmit and receive at preset intervals to prevent any signal interference between the transducers as is well known in the art.

As described above, the present invention can be used to determine the quality of the cement bond between the casing and the cement and between the cement and the formation at a particular point within the wellbore. The present invention can also be used to determine the quality of the cement at a particular point within the wellbore. Almost every wellbore has a borehole caliper log run therethrough to indicate the approximate wellbore diameter at increment of depth. By knowing the approximate wellbore diameter at a particular depth, the casing outside diameter at that depth, and the particular type of cement utilized, the expected velocity associated with the cement can be easily determined. By comparing the calculated expected cement velocity with the amplitude-time signals of the present invention, an indication of the cement quality can be determined. If the expected cement velocity compares approximately with the logged cement velocity, then this provides an indication that the cement is consistent, without foreign material or voids, at that location. However, if the comparison is not approximately the same, then foreign material or voids could be present.

Figure 2:
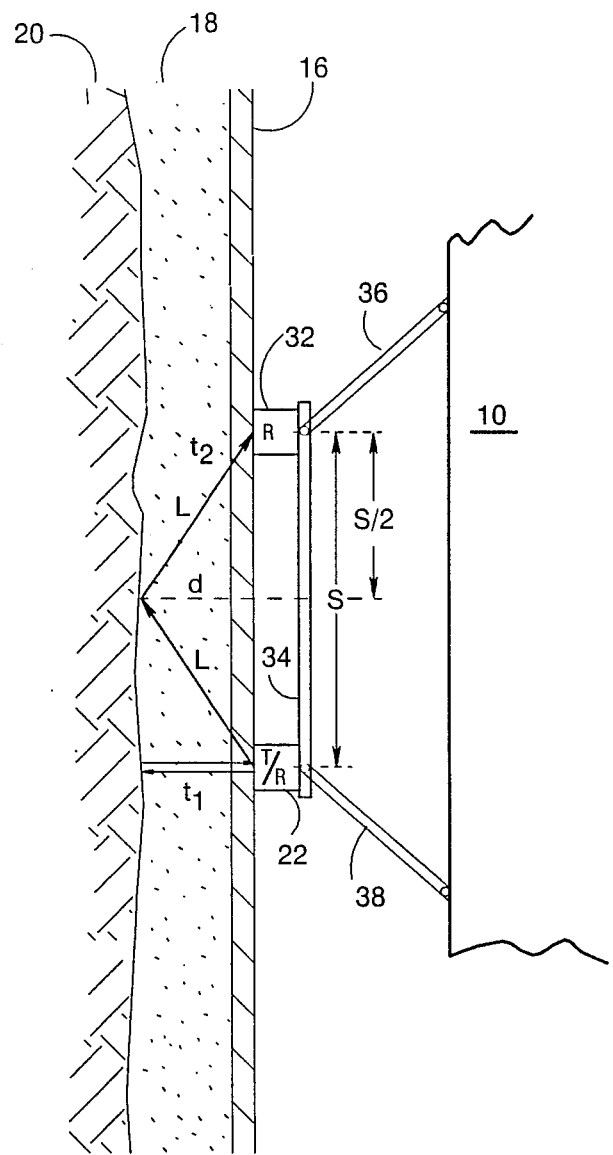
FIG. 2 is an elevational view of a longitudinal portion of an alternate embodiment of a cement bond logging apparatus, embodying the invention.

The embodiment shown in FIG. 2 includes the acoustic transmitting and receiving transducer (22) and the acoustic receiving transducer (32) mounted on a removable and pivotal bracket (34). At least two extendable arm members (36 and 38) extendable and extractable by pistons and/or springs (not shown) are used to place the transducers (22, 32) into contact with the interior surface of the casing (16). The distance between the vertically spaced transducer grouping (22, 32) is denoted by "S" and half the distance is "S/2." A time increment ($t_1$) is the time it takes the acoustic energy to leave the acoustic transmitting and receiving transducer (22), be reflected off of the cement-formation interface, and return. A time increment ($t_2$) is the time it takes the acoustic energy to leave the acoustic transmitting and receiving transducer (22), be reflected off of the cement-formation interface, and be received at the acoustic receiving transducer (32).

To determine the thickness of the cement, i.e., the distance "d" between the casing (14) and the cement-formation interface, the distance "S" and the times ($t_1$) and ($t_2$) are used as follows:

$$d = vt_1/2 \quad (1)$$

$$L = vt_2/2 \quad (2)$$

$$L = \sqrt{d^2 + (s/2)^2} \quad (3)$$

$$vt_2/2 = \sqrt{d^2 + (S/2)^2} \text{ substituting for } L \text{ in (3)}$$

$$vt_2^2/4 = d^2 + S^2/4$$

$$v^2 t_2^2 = 4 d^2 + S^2$$

$$v^2 = (4d^2 S^2)/t_2^2$$

$$v = \sqrt{(4d^2 + S^2)/t_2^2}$$

$$d = t_1/2 \sqrt{(4d_2 + S^2)/t_2^2} \text{ substituting for } V \text{ in (1)}$$

$$d^2 = t_1^2/4 \, [(4d^2 + S^2)/t_2^2]$$

$$4d^2 = (4d^2 t_1^2 + S^2 t_1)/t_2^2$$

$$4d^2 t_2^2 = 4d^2 t_1^2 + S^2 t_1^2$$

$$d^2 (4t_2^2 - 4t_1^2) + S^2 t_1^2$$

$$d^2 = (S^2 t_1^2)/(4t_2^2 = 4t_1^2)$$

$$d^2 = S^2 t_1^2/4 \, (t_2^2 - t_1^2)$$

$$\therefore d = 1/2 \, (S^2 t_1^2/t_2^2 - t_1^2)^{1/2} \quad (4)$$

Equation 4 represents the cement thickness in terms of the transducer spacing "S" and the traveltime increments ($t_1$) and ($t_2$). Further, to determine the velocity of the acoustic energy through the cement, the distance "S" and the time increments ($t_1$) and ($t_2$) are used as follows:

$$d = vt_1/2 \quad (1)$$

$$v = 2d/t_1$$

$$\therefore v = (1/t_1) \sqrt{S^2 t_1^2/(t_2^2 - t_1^2)} \quad (5)$$

substituting for d in (4).

Equation 5 represents the acoustic velocity associated with the cement in terms of the transducer spacing "S" and the traveltime increments ($t_1$) and ($t_2$) As can be readily understood by those skilled in the art, the above described methods of determining the cement thickness at a particular location within the wellbore and the acoustic velocity associated with the cement provide valuable diagnostic methods not previously obtainable.

Wherein the present invention has been described in particular relation to the drawings attached hereto, it should be understood that other and further modifications, apart from those shown or suggested herein, can be made within the scope and spirit of the present invention.

What I claim is:

1. A method of determining the absence or presence of foreign material and/or voids in the cement adjacent a casing set within a wellbore, comprising:
   (a) positioning at least one acoustic transmitting and receiving transducer and at least one acoustic receiving transducer into contact with an interior surface of the casing with the at least one acoustic receiving transducer being vertically spaced a predetermined distance from the at least one acoustic transmitting and receiving transducer;
   (b) transmitting from the at least one acoustic transmitting and receiving transducer at least one pulse of acoustic energy through the casing to a reflecting boundary representative of an interface between disparate material surrounding the wellbore;
   (c) measuring the times between the transmission of the pulse of acoustic energy and the reception of the acoustic energy at the at least one acoustic transmitting and receiving transducer and the at least one acoustic receiving transducer;
   (d) from the measured times and the known distance between the at least one acoustic transmitting and receiving transducer and the at least one acoustic receiving transducer determining the acoustic velocity associated with the cement; and
   (e) determining the absence or presence of foreign material and/or voids in the cement by comparing the acoustic velocity associated with the cement of step (d) to a known acoustic velocity associated with the cement.

2. The method of claim 1 wherein step (d) utilizes the equation:

$$v = (1/t_1) \sqrt{S^2 t_1^2/(t_2^2 - t_1^2)}$$

wherein v equals the acoustic velocity of the cement, $t^1$ and $t^2$ represent the time increment for the travel times of the acoustic energy from and to the at least one acoustic transmitting and receiving and transmitting transducer and the at least one acoustic receiving transducer.

* * * * *

UNITED STATES PATENT AND TRADEMARK OFFICE
CERTIFICATE OF CORRECTION

PATENT NO. : 4,800,537
DATED : January 24, 1989
INVENTOR(S) : Houston B. Mount, II It is certified that error appears in the above—identified patent and that said Letters Patent is hereby corrected as shown below:

Column 6, line 46, delete the word "bore".

Column 7, line 46, following "$(4d^2$" insert -- $+$ --.

Column 8, line 13, "$(t_2)$" should be followed by a period.

Column 8, line 50, delete the word "and".

Column 8, line 65, following the words "acoustic transmitting and", insert --receiving transducer and the acoustic receiving transducer, and S is the known distance between the at least one acoustic--.

Signed and Sealed this

Twenty-sixth Day of September, 1989

*Attest:*

DONALD J. QUIGG

*Attesting Officer*　　　　*Commissioner of Patents and Trademarks*